United States Patent [19]
Friske et al.

[11] Patent Number: 6,070,170
[45] Date of Patent: *May 30, 2000

[54] NON-BLOCKING DRAIN METHOD AND APPARATUS USED TO REORGANIZE DATA IN A DATABASE

[75] Inventors: Craig Alan Friske; Gary Howard Sockut; James Zu-Chia Teng, all of San Jose; Stephen Walter Turnbaugh, Hollister, all of Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/942,453

[22] Filed: Oct. 1, 1997

[51] Int. Cl.$^7$ ............................. G06F 12/00; G06F 17/30
[52] U.S. Cl. ....................... 707/202; 707/200; 707/201; 714/1
[58] Field of Search ................... 707/200, 202, 707/201–205, 2, 8; 395/616; 714/1, 710

[56] References Cited

U.S. PATENT DOCUMENTS

| | | | |
|---|---|---|---|
| 5,398,142 | 3/1995 | Davy | 360/48 |
| 5,408,654 | 4/1995 | Barry | 395/600 |
| 5,574,851 | 11/1996 | Rathunde | 395/182.05 |
| 5,574,907 | 11/1996 | Jernigan, IV et al. | 395/601 |
| 5,596,747 | 1/1997 | Katabami et al. | 395/612 |
| 5,691,717 | 11/1997 | Tamura | 341/50 |
| 5,721,915 | 2/1998 | Sockut et al. | 395/616 |
| 5,758,357 | 5/1998 | Barry et al. | 707/202 |
| 5,761,667 | 6/1998 | Koeppen | 707/101 |
| 5,774,716 | 6/1998 | Harbinski et al. | 395/618 |

FOREIGN PATENT DOCUMENTS

| | | | |
|---|---|---|---|
| 406067944 | 3/1994 | Japan | G06F 12/00 |
| 406067950 | 3/1994 | Japan | G06F 12/00 |

OTHER PUBLICATIONS

M. Benedict et al., Application of Inverted Cone–Shaped Structures For Accurate Alignment of Laser Diodes, Fibers and Micro–Lenses, *IBM—Technical Disclosure Bulletin*, 35:3, pp. 141–144, Aug. 1992.

V. Sharma, T3 Delay Simulator, *IBM—Technical Disclosure Bulletin*, 36:5, pp. 161–163, May 1993.

U. Manber et al., Concurrency Control in a Dynamic Search Structure, University of Washngton, Association for Computing Machinery (ACM), pp. 268–282, 1982.

U. Manber, Concurrent Maintenance of Binary Search Trees, *IEEE Transactions on Software Engineering*, vol. SE–10, No. 6, pp. 777–784, Nov. 1984.

U. Manber et al., Concurrency Control in a Dynamic Search Structure, *ACM Transactions on Database System*, vol. 9, No. 3, pp. 439–455, Sep. 1984.

(List continued on next page.)

*Primary Examiner*—Hosain T. Alam
*Assistant Examiner*—Uyen Le
*Attorney, Agent, or Firm*—Gray Cary Ware Freidenrich

[57] ABSTRACT

A method and apparatus for online reorganization of a database which does not prevent a process from accessing the database during the data reorganization. The invention uses a non-blocking drain to lock on a database, unloads a copy of the data contained in the database, reorganizes the copied data, loads the reorganized data into a shadow location, applies log records to the shadow location data so that the reorganized data may be adjusted for any changes to the database after the data was copied and reorganized, and then replaces the data in the database with the reorganized data. The non-blocking drain does not prevent other requests on the database from being processed while the reorganization lock is in place, except briefly when the reorganized data replaces the data in the database.

20 Claims, 4 Drawing Sheets

OTHER PUBLICATIONS

Y. Sagiv, Concurrent Operations on B–Trees with Overtaking, Hebrew University, Israel, Association for Computing Machinery (ACM), pp. 28–37, 1985.

Y. Sagiv, Concurrent Operations on B–Trees With Overtaking, *Journal of Computer and System Sciences*, vol. 33, pp. 275–296, Received Aug. 20, 1985, revised Jun. 16, 1986.

N. Goodman et al., Semantically–Based Concurrency Control For Search Structures, Sequoia Systems, Association for Computing Machinery (ACM), pp. 8–17, 1985.

E. Omiecinski, Concurrency During The Reorganization of Indexed Files, *IEEE Computer Software & Application Conference*, pp. 482–485, 1985.

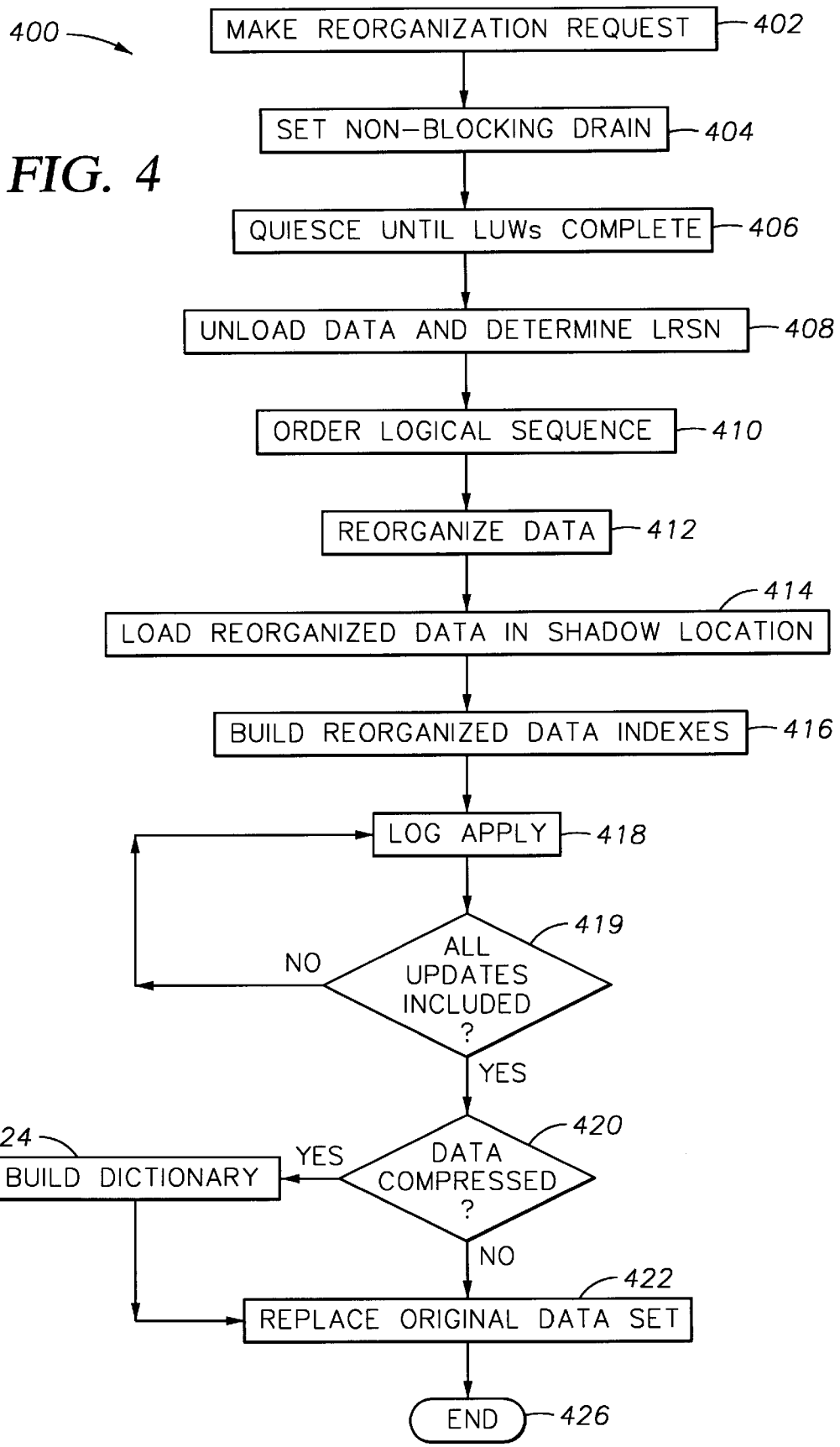

NON-BLOCKING DRAIN METHOD AND APPARATUS USED TO REORGANIZE DATA IN A DATABASE

RELATED APPLICATIONS

The present application relates to U.S. patent application Ser. No. 08/366,564 (parent application) filed Dec. 30, 1994, now abandoned and entitled "Interaction Between Application of a Log and Maintenance of a Table that Maps Record Identifiers During Online Reorganization of a Database"; U.S. patent application Ser. No. 08/457,150 (child application) now U.S. Pat. No. 5,721,915, a continuation of the parent application, filed Jun. 1, 1995 and entitled "Interaction Between Application of a Log and Maintenance of a Table that Maps Record Identifiers During Online Reorganization of a Database"; and U.S. patent application Ser. No. 08/885,955, a File Wrapper Continuation (37 C.F.R. 1.62) Application of the child application and entitled "Interaction Between Application of a Log and Maintenance of a Table that Maps Record Identifiers During Online Reorganization of a Database", filed Jun. 30, 1997.

BACKGROUND OF THE INVENTION

1. Field of the Invention

The present invention relates to the online reorganization of data contained in a database. More particularly, the invention concerns a method and apparatus for reorganizing a database while allowing substantially uninterrupted access to the database.

2. Description of the Related Art

Databases are used on computers for a myriad of reasons. In many cases the databases are extremely large, having entries in the millions. With large databases, the information must be available at all times on a transactional or real time basis, and large mainframe computers are usually employed to access the data. International Business Machines Corporation, (IBM), assignee of the current invention, has developed the leading database environment referred to as DB2 for use in conjunction with compatible mainframe computers.

One feature common in all database systems and included in the DB2 is the capability to index various information. The use of the index allows faster access for searches and requests based upon the indexed information. DB2 uses a balanced tree index structure. In this structure, root, tree and leaf pages are used, with each page at each level containing the same number of entries, except the last one. The leaf pages are the lowest level and each contains a number of entries referring to the actual data records contained in DB2 data tables. Each leaf page is maintained in internal logical order automatically by DB2. Tree pages are the next level up, and are used to indicate the logical order of the leaf pages.

For large databases, there may be several layers of tree pages, for example, a higher level of tree pages referencing a lower level of tree pages. Ultimately, the number of tree pages is reduced such that all the entries or references fit into a single page referred to as the root page. As in leaf pages, within each tree or root page the entries are kept in logical order automatically by DB2.

One problem with this type of index organization is the physical location of the leaf pages often becomes quite scattered. Another problem is that the rows of an index—an index being ordered row by row—may become scattered across multiple data pages, rather than clustered together. This scattering results in reduced performance as now the storage device must move between widely scattered physical locations if logical order operations are to be performed. This is true of whatever type of direct access storage device (DASD) is used to store the index or data file. Therefore, the files, including the index file, need to be reorganized periodically so that the logical and physical ordering between the leaf pages and data pages better correspond. However, current methods used to reorganize the files require access to the files to be restricted for the most part of the reorganization process. In a database that requires 24×7 availability, that is, twenty-four hours-a-day, seven days-a-week accessibility, long durations of data unavailability are unacceptable.

One example of a database requiring 24×7 availability is a financial database for storing a bank's records. Regular record reorganization is required to minimize storage overhead for the ever changing records. However, a bank cannot afford to "close down" record access to reorganize its database. Customer service requires access during the day, and processing other transactions, commonly occurring at night, requires nighttime access.

Recognizing that a reorganization utility can be one of the largest inhibitors to data access—reorganization utilities commonly block access to the data by other utilities and applications during the reorganization process—several solutions have been proposed to make data available more of the time. These "online" reorganization methods help minimize data "outages."

A major drawback to these techniques is that they require a reorganizational process to request a "blocking drain", also known as a lock, on a resource, thereby making other processes wait. For example, if reorganizational process B requests a lock, it must wait until a process A, which already has a lock, finishes. If another process C comes along before process A finishes, process C queues up behind process B and must wait for both A and B to finish. Once A finishes, B locks the database and process C continues to wait until reorganizational process B can record a starting point. The wait experienced by process C can be substantial if process A is long running or does not complete, or if process C must also wait for additional processes preceding A to finish.

Accordingly, there is a need for an online database reorganization technique using a "non-blocking" drain which will wait for a resource without blocking other requests on that resource. Referring to the above example, there is a need for a technique where process C can access the database while process B waits for process A to finish so that a reorganization starting point, or logical record sequence number (LRSN), can be established by B, thereby allowing the reorganization process to begin.

There is also a need for an online database reorganization technique using a non-blocking drain which allows access to a database during the reorganization of the data and minimizes unavailability of the database in completing the reorganization process.

SUMMARY OF THE INVENTION

Broadly, the present invention concerns an online database reorganization process using a non-blocking drain. The process does not block other process's requests for access to the target database during the data reorganization, even if the reorganization process is waiting for the target database to become available. The reorganization technique only briefly causes the database to be unavailable when completing the reorganization process.

In one embodiment, the invention may be implemented to provide a method to reorganize a database that does not prevent other processes from accessing the database while the reorganization is in progress. The method uses a non-blocking drain to lock on an original database or "resource", unloads data to be reorganized from the resource, assigns a LRSN, reorganizes the copied data, and loads it into a shadow location. Log records may be used to adjust the data in the shadow location to account for changes to resource data that occurred after the data was unloaded. Lastly, the data in the resource is replaced with the reorganized data.

In another embodiment, the invention may be implemented to provide an apparatus comprising a database and a digital processing device. The digital processing device may be configured in one embodiment to receive data from the database and then is used to reorganize and restore the database as disclosed immediately above.

In still another embodiment, the invention may be implemented to provide a signal-bearing medium tangibly embodying a program of machine-readable instructions executable by a digital data processing apparatus to perform a method for reorganizing a database.

The present invention affords its users with a number of distinct advantages. One advantage is that the invention provides substantially continuous access to the database while the reorganization process is executing or waiting to execute. Another advantage is that the invention provides for a non-blocking drain which is different than a blocking drain. The non-blocking drain allows the reorganization process to lock and queue while earlier-processes— processes which requested database access before the reorganization process—to complete their routine. At the same time, database access by later-processes, that is, processes requesting database access after the reorganization process, is not impeded by the non-blocking drain.

Another advantage of the present invention is that the only time the database is inaccessible to processes other than the reorganization process is briefly when the data in the original database is replaced with the reorganized data. Furthermore, the invention also provides a number of other advantages and benefits, which should be apparent from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein:

FIG. 4 is a flowchart of an operational sequence for reorganizing data in a database in accordance with the invention.

DETAILED DESCRIPTION OF THE PREFERRED EMBODIMENTS

Hardware Components & Interconnections

Figure 1:
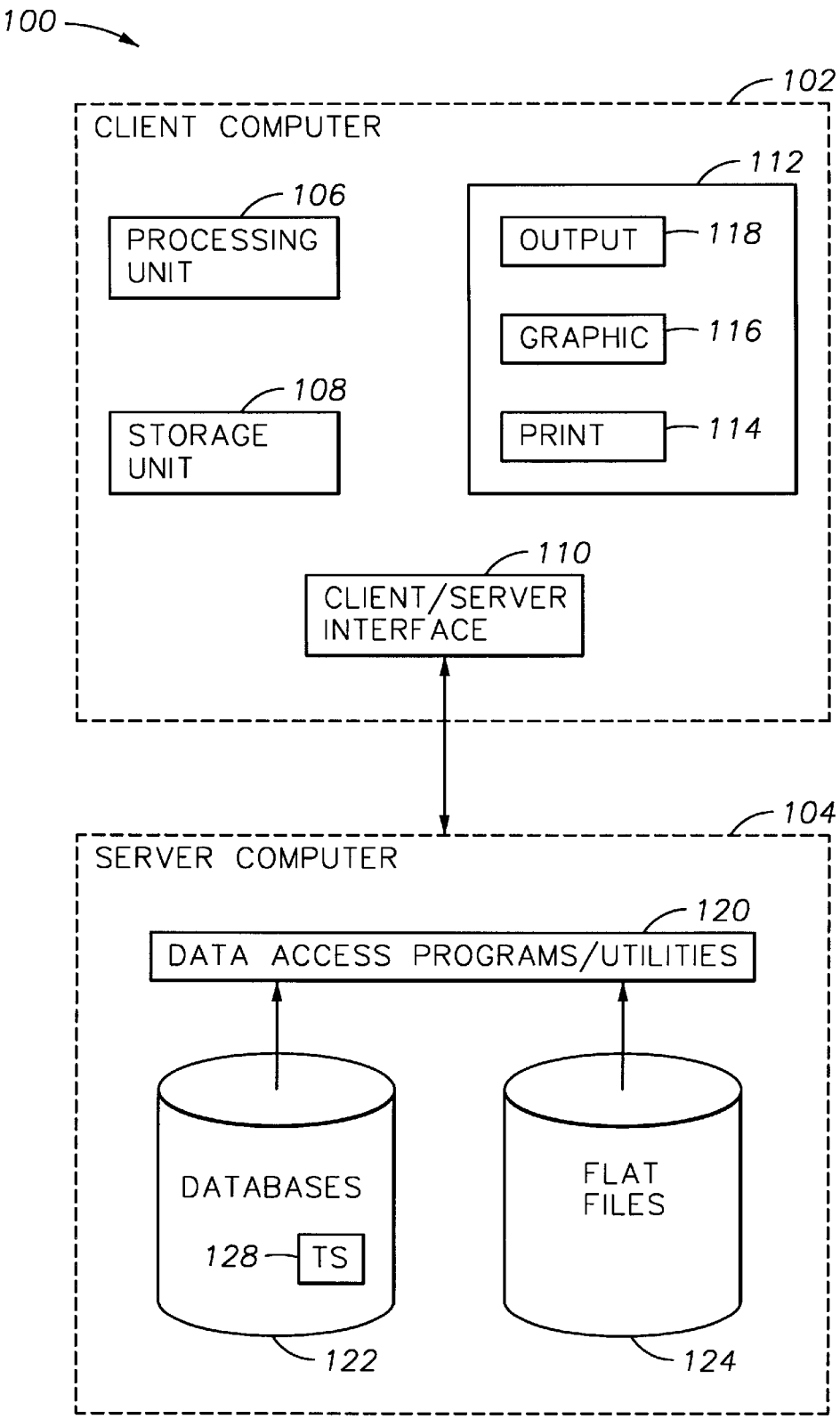
FIG. 1 is a block diagram of the hardware components and interconnections of a digital data processing apparatus used to reorganize data in a database in accordance with the invention.

One aspect of the invention concerns a digital data processing apparatus 100, which may be embodied by various hardware components and interconnections. FIG. 1 shows an example of one such digital data processing apparatus 100. The apparatus in the illustrated embodiment includes a client computer 102 and a server computer 104 including a processing unit 106, such as a microprocessor or other processing machine, communicatively coupled to a storage unit 108. In the present example, the storage unit 108 includes a fast-access memory and may include nonvolatile storage. The fast-access memory preferably comprises random access memory, and may be used to store the programming instructions executed by the processing unit 106 during execution of a program. The nonvolatile storage may comprise, for example, one or more magnetic data storage disks such as a "hard drive" or any other suitable storage device. Further, the client computer 102 may include in one embodiment an output module 112 for outputting/displaying program status results on a graphic display 116, print mechanism 114 or data storage medium 118.

The apparatus 100 also includes a client/server interface 110, such as a line, bus, cable, electromagnetic link or other means for exchanging data with the server computer 104. In one embodiment, the server computer 104 may be a mainframe computer manufactured by the International Business Machines Corporation of Armonk, N.Y., and may use an operating system sold under trademarks such as MVS. Or, the server computer 104 may be a Unix computer, or OS/2 server, or Windows NT server or IBM RS/6000 530 workstation with 128 MB of main memory running AIX 3.2.5. The server computer 104 may incorporate a database system, such as DB2 or ORACLE, or it may access data on files stored on a data storage medium such as disk, e.g., a 2 GB SCSI 3.5" drive, or tape. In another embodiment, the server computer 104 may comprise one or more magnetic data storage disks commonly referred to as direct access storage devices (DASD).

FIG. 1 also shows that, through appropriate data access programs and utilities 120, the client computer 102 may access one or more databases 122 and/or flat files (i.e., text files) 124 which contain data. As is well known in the art, a database may contain one or more partitions and tablespaces 128 which are logical divisions of the database.

Despite the specific foregoing description, ordinarily skilled artisans (having the benefit of this disclosure) will recognize that the apparatus discussed above may be implemented in a machine of different construction, without departing from the scope of the invention. Other computers, servers, computer architectures or database systems than those discussed may be employed. As a specific example, one or more of the components of output module 112 may be eliminated; furthermore, the storage unit 108 may be provided on-board the processing unit 106, or even provided externally to the client computer 102 or the apparatus 100. Furthermore, the client computer 102 may be combined with the server computer 104 as one unit.

Operation

In addition to the various hardware embodiments described above, a different aspect of the invention concerns a method for reorganizing a database.

Signal-Bearing Media

Such a method may be implemented, for example, by operating the apparatus 100 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to reorganize a database.

Figure 2:
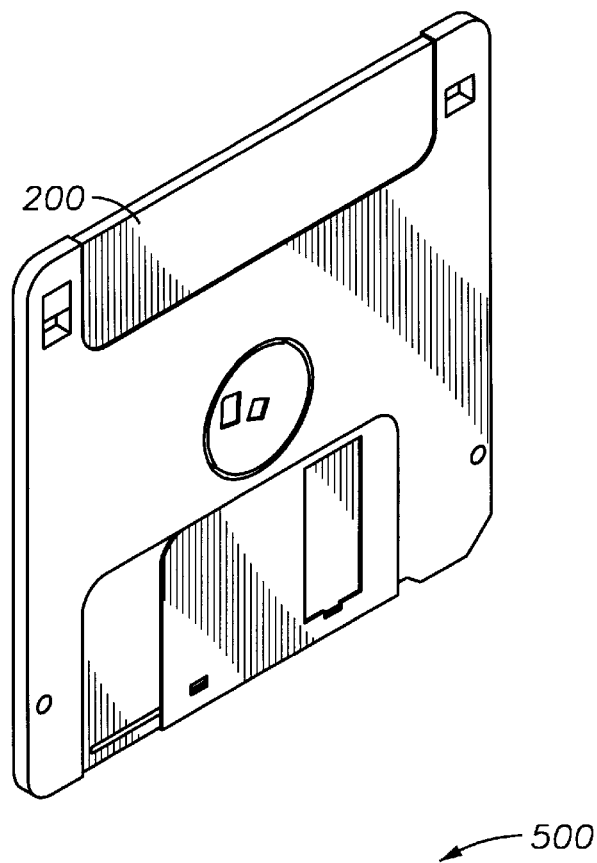
FIG. 2 is an exemplary example of a signal-bearing medium embodying a program of machine-readable instructions executable by the digital data processing apparatus of FIG. 1 in accordance with the invention.

This signal-bearing media may comprise, for example, RAM (not shown) contained within the apparatus 100. Alternatively, the instructions may be contained in another signal-bearing media, such as a magnetic data storage diskette 200 (FIG. 2), directly or indirectly accessible by the apparatus 100. Whether contained in the apparatus 100 or elsewhere, the instructions may be stored on a variety of machine-readable data storage media, such as DASD storage (e.g., a conventional "hard drive" or a RAID array), magnetic tape, electronic read-only memory (e.g., ROM, EPROM, OR EEPROM), an optical storage device (e.g., CD-ROM, WORM, DVD, digital optical tape), paper "punch" cards or other suitable signal-bearing media including transmission media such as digital and analog and communication links and wireless. In an illustrative embodiment of the invention, the machine-readable instructions may comprise lines of compiled C++ language code, or any other computer language or code capable of communicating implementation instructions.

Overall Sequence of Operation

Figure 3:
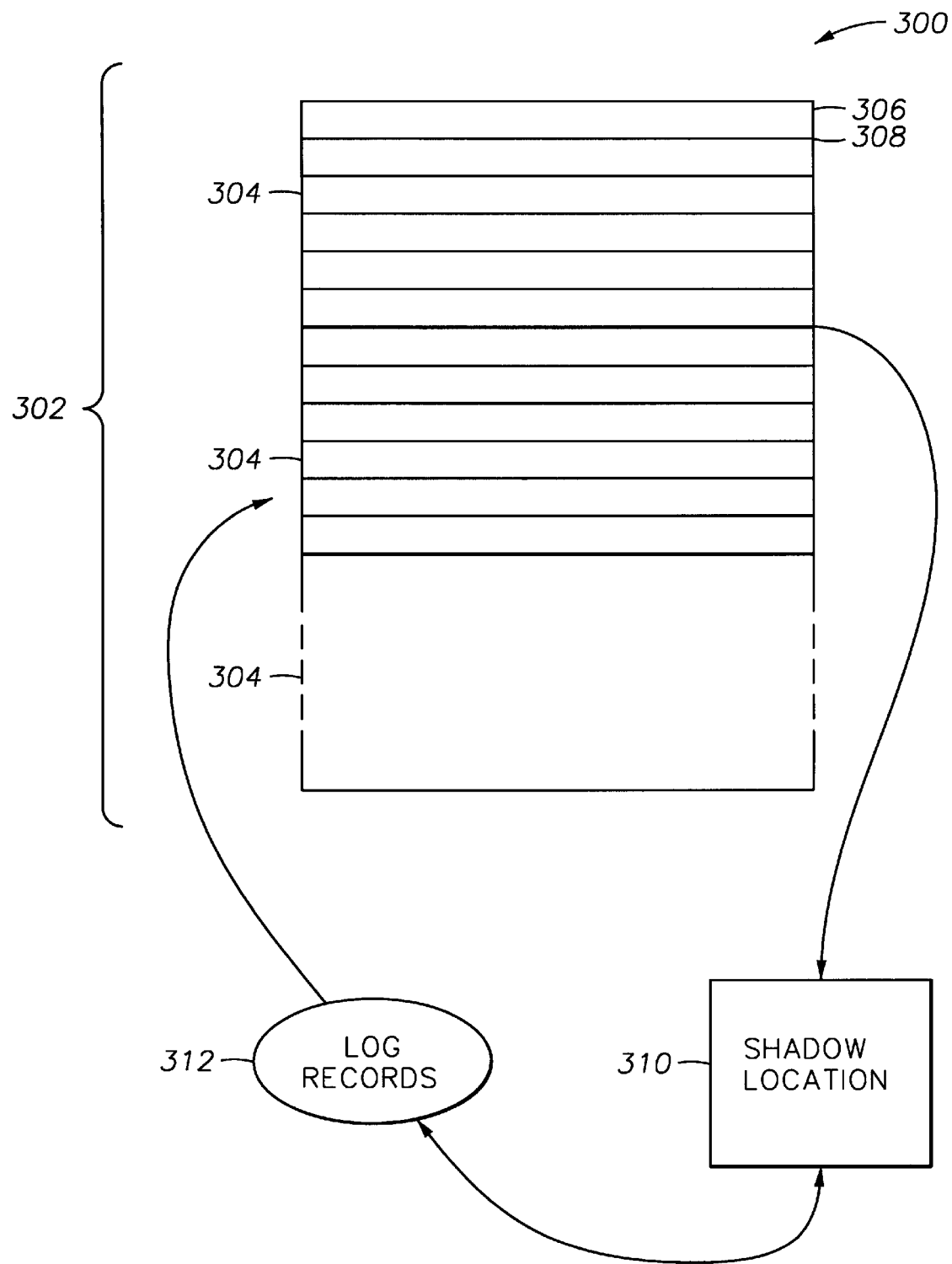
FIG. 3 shows a sequence of method steps generally illustrating one embodiment of the method of the present invention.

FIG. 3 shows a sequence of method steps 300 to illustrate a general example of the method aspect of the present invention. For ease of explanation, but without any limitation intended thereby, the example of FIG. 3 is described in the context of the apparatus 100 described above.

A logical database 302 shown in FIG. 3 may comprise one or more physical databases and represents hierarchic, structured relationships between data segments that can differ from the physical structure in which the data segments were loaded in the physical database 122. In one embodiment, the database 302 may be logically divided into one or more tablespaces where each tablespace is comprised of one or more partitions 304. A tablespace 306 may comprise a set of pages 308 used to store the records of one or more tables in a DB2 program; that is, they contain data segments of some number of fixed-length blocks. A table in the preferred embodiment refers to an array of data where each item in the array can be unambiguously identified.

Generally, the logical pages 308 do not need to be stored in any particular order in a physical storage unit housing a database. However, the logical database 302 must be able to find the location of a given page 308 on the physical storage unit at any time. As is well known in the art, this is accomplished by constructing an index representing each page of the database. Each entry in the index contains a pointer to the physical location of a related page in the physical database. For example, the first index entry contains a pointer to the first page in the physical database 122, and the second index entry contains a pointer to the second page in the physical database 122. Typically, the order of pages 308 in the logical database 302 does not correspond to the physical order in which the pages appear within the physical database 122.

In one embodiment of the present invention, a data reorganization request is made and a "non-blocking" drain, as discussed in detail below, places a lock on the database. The lock signals to the apparatus 100 that a request for database access has been made so that the reorganization process may proceed. Additionally, changes to the formatting of subsequently generated log records may occur to allow compatibility with the present invention's log record processing as discussed below. A data set subject to reorganization (target data set), such as a set of pages 308, is "unloaded" from the logical database 302. In the preferred embodiment, unloading a data set refers to copying a data set to the flat files 124 that contains a copy of the target data records, and may be used in subsequent steps as a primary source of input for recreating the database. Alternatively, the data set could be copied to storage unit 108 via data access 120 if storage unit 108 is provided with sufficient capacity.

During the unload phase, it is determined if any processes are using or requesting access to the database. A LRSN, or logical record sequence number, is recorded for each such process and logically marks or "timestamps" when database access was first requested by each process. This is used by the present invention to distinguish which processes requested database access before the reorganization process was begun and are still actively using the database, and which processes either began after the reorganization process and are active or have made an access request but are queued and waiting to gain access to the database.

After LRSN's have been assigned, the unloaded target data set is reorganized by the processor 106 and loaded into a shadow location 310 of the storage unit 108. As mentioned above, various hardware devices well known in the art may be used to perform the method of the present invention, and its implementation should not be limited to the specific example discussed in relation to any one embodiment. In the preferred embodiment, the shadow location 310 serves as a temporary working location. Log records 312, reflecting changes which occurred to the original data set after the target data set was unloaded until the present time, are then applied to the target data set in the shadow location 310. The log records update the target data to the logical equivalent of the original data set although in the preferred embodiment, the target data set remains in substantially reorganized form. In another embodiment, greater degrees of disorganization may occur to the target data set and further reorganization may be required. In any case, after updating the target data, the original data set is then replaced with the target data set.

FIG. 4 shows a more detailed sequence of method steps 400 to illustrate one example of the method aspect of the present invention. For ease of explanation, but without any limitation intended thereby, the example of FIG. 4 is also described in the context of the apparatus 100 described above. The steps are initiated in task 402, when a data reorganization request is received by the processor 106. The request may be communicated using various mediums standard to computer systems, for example, manually by a user via a keyboard (not shown), or automatically using commands stored in the storage unit 108 and activated at a predesignated time.

Following a reorganization request, a "non-blocking" drain in task 404 places a lock on a new target data set contained in the database 122. The non-blocking drain does not acquire a "traditional" lock on the target data set, wherein a lock is generally understood to be a serialization mechanism by which a data set is restricted for use only by the holder of the lock. With the non-blocking drain, any requests to access the target data set will not be blocked although the sequence in which a lock was requested is still recorded. This allows other processes that need to use the target data set to access the data set even when the reorganization process is taking place.

Traditionally, a blocking drain has been used to request a lock on a target data set for data reorganization purposes. The process requesting the lock, B, would have to wait for the target data set if another process, A, already had a lock on the target data set. If another process, C, came along and requested access to the target data set, it would be placed in a queue behind B waiting for access to the data set. Assuming the reorganization process B and process C were queued and waiting behind A for the target data set, the unload phase shown as task 408 would have to wait to use the target data set until all active logical work units (LUW) of process A were completed, where a LUW includes the processing a program performs between synchronization points with the apparatus 100. Obviously, the problem occurs because the reorganization process is requesting access to the same table space being used by the LUW that is currently active. The resulting waiting period could be of a very long duration if the original active LUW's were long running or did not complete.

In the present invention, a delay starting the unload phase shown in task 408 of the reorganization process is tolerable, but preventing other processes from accessing the target data set is not tolerable. By using a non-blocking drain in the present invention, the drawbacks of the traditional blocking drain lock are overcome because the reorganization process of the present invention will wait for a target data set without blocking other requests on that data set. The other processes pay little notice to the existence of the non-blocking drain and are not prevented from gaining access to the target data set. One exception is that these other processes may change their generation of log records so that the reorganization process can successfully process them. For example, the format in which the log records are generated may change so that the records can be successfully processed by the invention.

Figure 5:
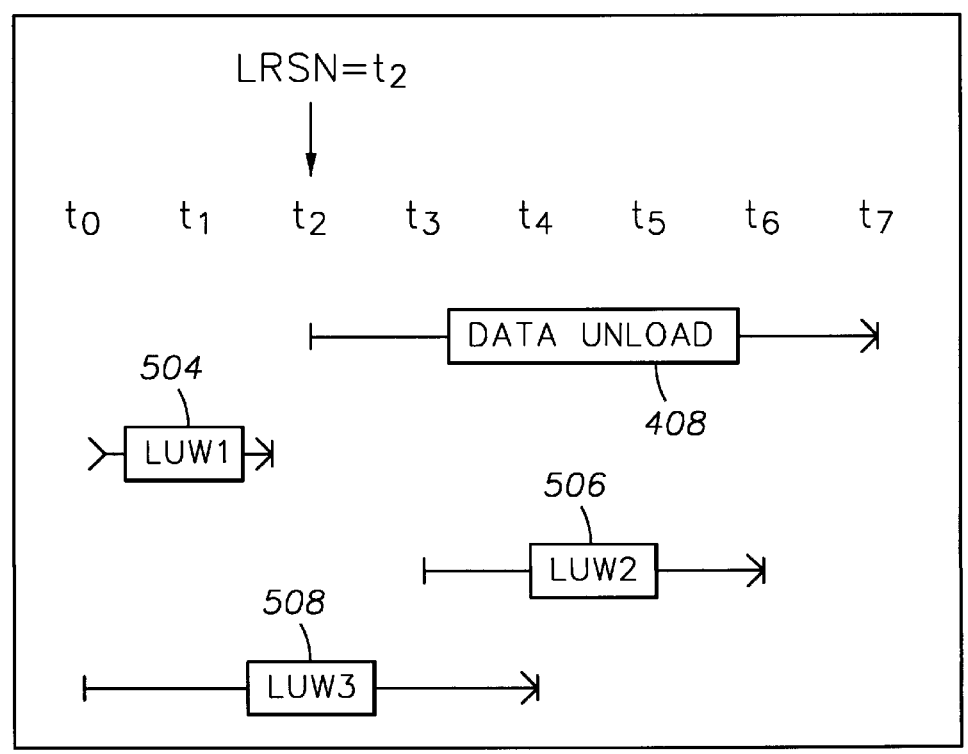
FIG. 5 shows the timing of the unload step in the operation sequence of FIG. 4 with respect to different logical units of work in accordance with one embodiment of the present invention.

After the method has quiesed until all active LUW's for processes requesting data access before the reorganization process are completed as shown in task 406, unloading of the data in task 408 commences and comprises assigning a LRSN to each change made to the database. An LRSN is associated to each change to optimize integration of the changes. For example, a log record may use the LRSN to distinguish whether an update to a page of the database has already been completed. Using a single data set as an example, the unload will pick up data record changes made at or after a time t2, as shown in FIG. 5, where t2 represents the point where the reorganization unload LRSN is assigned, and FIG. 5 shows a timeline representation of the data unload step 408. As shown in FIG. 5, the unload step 408 in one embodiment of the present invention begins at time t2 (LSRN=t2) and extends to time t7 representing the completion of the reorganization process. The data unload 408 will pick up data records starting at time t2, and then conduct a scan of the entire tablespace to determine changes to the database. The time t2 is also a marking point for implementing log records, discussed below.

Returning to FIG. 4, after the target data set has been unloaded, the data is ordered in logical sequence in task 410, reorganized in task 412, and loaded into a shadow location in task 414. The target data set may include data indexes which, after the target data set has been reorganized, may be rebuilt into reorganized data indexes in task 416. Rebuilding the data indexes is necessary in the preferred embodiment as discussed above so that quick access to the reorganized data may occur. Log records are applied to the target data set in the shadow location in task 418 which allows any changes to the original data set which occurred while the reorganization was taking place to be applied to the reorganized target data set.

The processing of the log records (logs) for changes made to the original database by various LUWs is handled as follows. Referring to FIG. 5, the logs will not pick up changes made to the database by LUW1 504 and update the reorganized data because LUW1 504 has completed before reorganization 408 began unloading the target data set records. Any changes which occurred due to LUW1 504 will be picked up during the reorganization unload 408 of the records.

However, LUW2 506, which started after time t2, is treated differently than LUW1 504 by the reorganization process 400. All changes to LUW2 506 will be read as part of the log apply 418 shown in FIG. 4. If the timing is such that only read operations are performed—after time t2 and before t4—marking the end of LUW2 506, then the logs need not include any updated data concerning LUW2 506. If the unload of task 408 missed some or all of the data changes occasioned by LUW2 506, for example, due to format differences, then those changes will be applied to the target data set by the log apply of task 418.

Furthermore, LUW3 508 started before the reorganization unload 408. In this case, in order to insure that all changes which occurred to the original data set between the time the reorganization unload began and the time the reorganization process 400 has completed, the present invention waits until time t4 for the reorganization unload 408 to begin. The time t4 represents the time when LUW3 508 has completed, thereby allowing all changes made by LUW3 508 to the original data set to be incorporated in the target data set. Essentially, waiting until time t4 for all LUWs active when the reorganization began to complete before beginning the unload phase insures that all of the changes occurring from LUW3 508 are processed properly during the unload step of reorganization 400. If the unload phase began before LUW3 completed, the log format of LUW3 could prevent the changes made to the database by LUW3 508 from being picked up by the logs. By waiting, the changes will be identified by the reorganization unload 408. Because a non-blocking drain lock is used by the present invention during this waiting period from t2 when the reorganization request was made, until the time t4, when all logical units of work which were active prior to time t2 have completed, potential data unavailability to any process seeking access to the original data set between time t2 and t4 is avoided. Additional LUWs pay no notice to the existence of the non-blocking drain placed on the original data set, and are able to immediately access the data unimpeded. The only activity which is held in abatement is the beginning of the reorganization process 400. This process of determining when a LUW of a given process began relative to the unload 408 is shown in task 410 as determining the order of the logical sequence of LUWs.

The log apply of task 418 is disclosed in U.S. patent application Ser. No. 08/366,564 (parent application) filed Dec. 30, 1994 and entitled "Interaction Between Application of a Log and Maintenance of a Table That Maps Record Identifiers During Online Reorganization of a Database" and is further discussed in U.S. patent application Ser. No. 08/457,150 (child application), a continuation of the parent application, filed Jun. 1, 1995 and entitled "Interaction Between Application of a Log and Maintenance of a Table That Maps Record Identifiers During Online Reorganization of a Database" and further discussed in U.S. patent application Ser. No. 08/885,955, a File Wrapper Continuation (37 C.F.R. 1.62) Application of the child application and entitled "Interaction Between Application of a Log and Maintenance of a Table That Maps Record Identifiers During Online Reorganization of a Database", filed Jun. 30, 1997. Each of the these applications is incorporated by reference herein. The log apply task of 418 updates the shadow version data to be logically equivalent with the original data set, although the shadow version remains in reorganized form. If a scan of the target data indicates that all data updates have not been included in the shadow version in task 419, then the method returns to and repeats task 418. Otherwise, the method continues to task 420.

The preferred method of the present invention may be practiced on both compressed and uncompressed data sets as shown in task 420. If the target data set does not comprise compressed data, the processor 106 replaces the original logical data set with the reorganized target data set in task 422, which is used to reorganize the physical database 122. Briefly during this replacement step, neither the original nor the reorganized data is accessible by a process request. After the reorganization of a database has occurred, the method ends in task 426.

If the target data set comprises compressed data, then a new dictionary for the compressed data is built in task 424. The use of such a dictionary is well known in the art, and is required to "de-compress" the compressed data. Because the data was reorganized, using the present invention, a new dictionary is required. Similar to the process as applied to uncompressed data, the compressed reorganized target data set replaces the compressed original data set in task 422. Again, the respective data sets are locked, thereby blocking any process request to access the data. The physical database 122 is updated and the method ends in task 426.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method for use in reorganizing a resource including data, the method comprising:
   in response to a reorganization request, using a non-blocking drain to lock on the resource;
   delaying processing of the reorganization request until the completion of processing of one or more requests on the resource made prior to the reorganization request;
   processing one or more requests on the resource made during the delay in processing of the reorganization request;
   after the delay in processing the reorganization request, processing the reorganization request by:
   unloading a copy of the data from the resource;
   reorganizing said copied data;
   loading said reorganized data into a shadow location;
   applying log records to said shadow location data, said log records adjusting said reorganized data for changes occurring to the resource after said data was unloaded; and
   replacing said data in the resource with said reorganized data.

2. The method recited in claim 1, further comprising:
   building reorganized data indexes; and
   replacing resource data indexes with said reorganized data indexes.

3. The method recited in claim 2, including determining a logical record sequence number, said logical record sequence number used to mark a logical time, wherein unloading said data and determining said logical record sequence number is queued until all processes utilizing said resource which were active when said lock was established have completed.

4. The method recited in claim 3, wherein said logical record sequence number is determined during the unloading of said data from the resource.

5. The method recited in claim 4, wherein said data is compressed data and the method includes building a new dictionary after said data is reorganized.

6. A signal-bearing medium tangibly embodying a program of machine-readable instructions executable by a digital processing apparatus to perform a method for reorganizing a resource including data, said method comprising:
   in response to a reorganization request, using a non-blocking drain to lock on the resource;
   delaying processing of the reorganization request until the completion of processing of one or more requests on the resource made prior to the reorganization request;
   processing one or more requests on the resource made during the delay in processing of the reorganization request;
   after the delay in processing the reorganization request, processing the reorganization request by:
   unloading a copy of the data from the resource;
   reorganizing said copied data;
   loading said reorganized data into a shadow location;
   applying log records to said shadow location data, said log records adjusting said reorganized data for changes occurring to the resource after said data was unloaded;
   replacing said data in the resource with said reorganized data; and
   wherein changes due to the processing of the requests made prior to the reorganization request and during the delay in processing the reorganization request are included in the processing of the reorganization request.

7. The signal-bearing medium for performing the data reorganization method as recited in claim 6, further comprising:
   building a reorganized data index; and
   replacing a resource data index with said reorganized data index.

8. The signal-bearing medium for performing the data reorganization method as recited in claim 7, including determining a logical record sequence number, said logical record sequence number used to mark a logical time, wherein unloading said data and determining said logical record sequence number is queued until all processes utilizing said resource and which were active when said lock was established have completed.

9. The signal-bearing medium for performing the data reorganization method as recited in claim 8, wherein said logical record sequence number is determined during the unloading of said data from the resource.

10. The signal-bearing medium for performing the data reorganization method as recited in claim 9, wherein said data is compressed data and the method includes building a new dictionary after said data is reorganized.

11. A digital processing machine used to reorganize a database, the device comprising:
   a database;
   a digital processing apparatus communicatively coupled to said database, the digital processing apparatus configured to receive data from said database, and further configured to receive data and commands from a signal-bearing medium tangibly embodying a program of machine-readable instructions executable by the digital processing apparatus and used to reorganize said database by:

in response to a reorganization request, using a non-blocking drain to lock on the resource;

delaying processing of the reorganization request until the completion of processing of one or more requests on the resource made prior to the reorganization request;

processing one or more requests on the resource made during the delay in processing of the reorganization request;

after the delay in processing the reorganization request, processing the reorganization request by:
unloading a copy of the data from the resource;
reorganizing said copied data;
loading said reorganized data into a shadow location;
applying log records to said shadow location data, said log records adjusting said reorganized data for changes occurring to the resource after said data was unloaded;
replacing said data in the resource with said reorganized data; and wherein changes due to the processing of the requests made prior to the reorganization request and during the delay in processing the reorganization request are included in the processing of the reorganization request.

12. The digital processing machine recited in claim 11, further comprising:

building a reorganized data index; and replacing a resource data index with said reorganized data index.

13. The digital processing machine recited in claim 12, including determining a logical record sequence number, said logical record sequence number used to mark a logical time, wherein unloading said data and determining said logical record sequence number is queued until all processes utilizing said resource and which were active when said lock was established have completed.

14. The digital processing machine recited in claim 13, wherein said logical record sequence number is determined during the unloading of said data from the resource.

15. The digital processing machine recited in claim 14, wherein said data is compressed data and the method includes building a new dictionary after said data is reorganized.

16. An apparatus for reorganizing a database, the apparatus comprising:

a digital processing apparatus configured to receive data from a database, and further configured to receive data and commands from a signal-bearing medium tangibly embodying a program of machine-readable instructions executable by the digital processing apparatus and used to reorganize said database;

means for storing said database;

non-blocking drain means for accessing and locking said database in response to a reorganization request;

means for delaying processing of the reorganization request until the completion of processing of one or more requests on the resource made prior to the reorganization request;

means for processing one or more requests on the resource made during the delay in processing of the reorganization request;

means for processing the reorganization request after the delay in processing, including:
copying means for copying data from said database;
means for reorganizing said copied data;
means for loading said reorganized data into a shadow location;
log means for applying log records to said shadow location data, said log records adjusting said reorganized data for changes occurring to said database after said data was unloaded; and
means for replacing said data in said database with said reorganized data.

17. The apparatus recited in claim 16, including means for determining a logical record sequence number, said logical record sequence number used to mark a logical time within said copied data, and wherein means for copying said data and determining said logical record sequence number is queued until all processes utilizing said database and which were active when said lock was established have completed.

18. The apparatus recited in claim 17, wherein said logical record sequence number is determined during unloading of said data from said database.

19. The apparatus recited in claim 18, further comprising:
means for building reorganized data indexes; and
means for replacing database data indexes with said reorganized data indexes.

20. The apparatus recited in claim 19, wherein said data is compressed data and the apparatus further comprises a means for building a new dictionary for said compressed data after said data is reorganized.

* * * * *